US012698802B2

(12) United States Patent
Olivieri et al.

(10) Patent No.: US 12,698,802 B2
(45) Date of Patent: Aug. 4, 2026

(54) ROLLING BEARING, IN PARTICULAR A WHEEL HUB ASSEMBLY, HAVING AN IMPROVED SERVICE LIFE AND RELATED METHOD

(71) Applicant: AKTIEBOLAGET SKF, Gothenburg (SE)

(72) Inventors: Davide Antonio Olivieri, Turin (IT); Riccardo Nardicchia, Turin (IT)

(73) Assignee: AKTIEBOLAGET SKF, Gothenburg (SE)

( * ) Notice: Subject to any disclaimer, the term of this patent is extended or adjusted under 35 U.S.C. 154(b) by 43 days.

(21) Appl. No.: 18/604,529

(22) Filed: Mar. 14, 2024

(65) Prior Publication Data

US 2024/0309912 A1 Sep. 19, 2024

(30) Foreign Application Priority Data

Mar. 15, 2023 (ID) ........................ 102023000004941

(51) Int. Cl.
    *F16C 33/66* (2006.01)
    *F16C 19/18* (2006.01)
(52) U.S. Cl.
    CPC ........ *F16C 33/6603* (2013.01); *F16C 19/186* (2013.01); *F16C 33/6633* (2013.01); *F16C 2326/02* (2013.01)
(58) Field of Classification Search
    CPC . F16C 19/186; F16C 33/6603; F16C 33/6633
    See application file for complete search history.

(56) References Cited

U.S. PATENT DOCUMENTS

| | | |
|---|---|---|
| 2016/0115413 A1 | 4/2016 | Hasegawa et al. |
| 2020/0112229 A1* | 4/2020 | Yabuta .................. F16C 41/002 |
| 2022/0106536 A1* | 4/2022 | Qin ...................... C10M 101/02 |

FOREIGN PATENT DOCUMENTS

| | | |
|---|---|---|
| DE | 102017113701 A1 | 12/2018 |
| EP | 2789705 A1 | 10/2014 |

(Continued)

OTHER PUBLICATIONS

Material specification sheet for LGMT 2 obtained Sep. 15, 2025.*

(Continued)

*Primary Examiner* — James Pilkington
(74) *Attorney, Agent, or Firm* — J-TEK LAW PLLC; Jeffrey D. Tekanic; Scott T. Wakeman

(57) ABSTRACT

A roller bearing includes inner and outer rings each having a raceway, an annular space between the raceways, and a plurality of rolling elements and a lubricating grease in the annular space. The raceways have a predetermined roughness value within a first predetermined range, and the lubricating grease contains graphene particles uniformly dispersed in a suspension in the lubricating grease. The graphene particles have an at least substantially circular shape, a diameter within a second predetermined range and a thickness within a third predetermined range. An amount of the lubricating grease in the annular space and the first, second and third predetermined ranges are selected such that a self-regenerating mat of graphene that at least partially coats the raceways will develop in use as a result of a relative rotation between the inner and outer rings and the rolling/sliding of the rolling elements on the raceways.

12 Claims, 1 Drawing Sheet

(56) References Cited

FOREIGN PATENT DOCUMENTS

| | | | |
|---|---|---|---|
| EP | 3978588 A1 | | 4/2022 |
| JP | 2003139147 A | * | 5/2003 |
| JP | WO2016002268 A1 | | 4/2017 |
| WO | 2015147937 A2 | | 10/2015 |

OTHER PUBLICATIONS

Translation of JP2003139147 obtained Sep. 15, 2025.*

"Graphene Enhanced Roller Bearing Lubricants" Syn-Tech Ltd. , Addison, Illinois, USA.

"The SKF Generalized Bearing Life Model for hybrid bearings", Sep. 23, 2019, pp. 1-8, ©SKF Evolution 2023.

A, Mura, et al., "Tribological performance of graphene-nanoplatelets as grease additive", 6° Workshop AIT "Tribologia e Industria". Apr. 18-19, 2018, Torino, Italy.

Adolfo Senatore, et al., "Estimation of tyre-road friction during ABS braking for snow and ice conditions", 6° Workshop AIT "Tribologia e Industria". Apr. 18-19, 2018, Torino, Italy.

C. Putignano, et al., "Soft Contacts in Dry and Lubricated Conditions", 6° Workshop AIT "Tribologia e Industria". Apr. 18-19, 2018, Torino, Italy.

Chenye Jian, et al., "Tribology Study of Self-lubricated Compounds and Plain Bearing in Oil-free Compressor", 6° Workshop AIT "Tribologia e Industria". Apr. 18-19, 2018, Torino, Italy.

Cristiana Delprete, et al., "Piston Ring Assembly Tribological Performance: Theoretical Analysis and Simulation", 6° Workshop AIT "Tribologia e Industria". Apr. 18-19, 2018, Torino, Italy.

Dr. Deepak Halenahally Veeregowda, "Tribometers for High Temperature Tribology", Ducom Instruments Europe B.V., Groningen, The Netherlands.

Elin Larsson, et al., "Grease-lubricated tribological contacts—Influence of graphite, graphene oxide and reduced graphene oxide as lubricating additives in lithium complex (LiX)- and polypropylene (PP)-thickened greases", Sep. 20, 2021, pp. 486-487, article published in "WEAR" by Elsevier B.V. , Amsterdam, The Netherlands.

Elisabetta Serpini, et al., "Friction mechanisms in MoS2 thin films: role of humidity and recrystallization phenomena", 6° Workshop AIT "Tribologia e Industria". Apr. 18-19, 2018, Torino, Italy.

Federico Colombo, et al., "Development of air bearings for high speed and high precision", 6° Workshop AIT "Tribologia e Industria". Apr. 18-19, 2018, Torino, Italy.

Flavia Gili, et al., "A tribological study of DLC coatings for valve train application", 6° Workshop AIT "Tribologia e Industria". Apr. 18-19, 2018, Torino, Italy.

Florian Pape, et al., "Investigations on Graphene Platelets as Dry Lubricant and as Grease Additive for Sliding Contacts and Rolling Bearing Application", Dec. 19, 2019, pp. 1-12, published by MDPI, Basel, Switzerland.

Francesca Cura, et al., "Experimental investigation about tribological performance of grapheme-nanoplatelets as additive for lubricants", AIAS 2018 International Conference on Stress Analysis, 2018, pp. 44-51, published by Elsevier B.V. , Amsterdam, The Netherlands.

Gabriele Samadello, "La superfinitura nel mondo dell'automotive", BF® Best Finishing. Engineering Del Trattamenti Superficiali Per Una Performance Ottimale, pp. 1-6, Agenti Rem Dal 1988, Italy.

Hui Fu, et al., "Graphene as a nanofiller for enhancing the tribological properties and thermal conductivity of base grease", Dec. 9, 2019, pp. 42481-42488, RSC Advances, Royal Society of Chemistry, UK.

Marco Alborghetti, et al., "L'utilizzo del grafene per ridurre l'attrito", Oct. 2020, pp. 54-57, "Organi Di Trasmissione", Italy.

Mohamed G. A. Nassef, et al., "Impact of Graphene Nano-Additives to Lithium Grease on the Dynamic and Tribological Behavior of Rolling Bearings", Feb. 18, 2022, pp. 1-18, published by MDPI, Basel, Switzerland.

Nicola Menga, et al., "Viscoelastic frictional behavior of RLRB seismic isolators", 6° Workshop AIT "Tribologia e Industria". Apr. 18-19, 2018, Torino, Italy.

Parveen Kumar, et al., "Synthesis and tribological properties of graphene: A review", Apr. 20, 2017, pp. 36-71, vol. 13, Jurnal Tribologi, © 2017 Malaysian Tribology Society.

Petroking Petroleum Hebei Co., Ltd, Company News webpage, posted Jul. 15, 2020, Handan city, China.

Pierluigi De Horatiis, et al., "Caratteristiche degli oli lubrificanti ed isolanti", 6° Workshop AIT "Tribologia e Industria". Apr. 18-19, 2018, Torino, Italy.

Pierre Leroux, et al., "World's 1st Dual-Load Controlled Tribometer", 6° Workshop AIT "Tribologia e Industria". Apr. 18-19, 2018, Torino, Italy.

Pietro Puddu, et al., "Critical materials replacement in wear-resistant thermal spray coatings", 6° Workshop AIT "Tribologia e Industria". Apr. 18-19, 2018, Torino, Italy.

Program of the 6th Workshop of the Italian Tribology Association A.I.T. , Apr. 18-19, 2018, Great Hall Polytechnic University of Turin-Lingotto via Nizza 230 Turin.

SKF Coatings, SKF®, "WS2/MoS2".

SKF®, "Rolling Element Bearings media lubricated".

Tadeusz Missala, et al., "Study on Tribological Properties of Lubricating Grease with Additive of Graphene", 2015, pp. 181-182, © Springer International Publishing Switzerland.

Terenziano Raparelli, et al., "Sistema di tenuta per la riduzione dell'attrito in attuatori pneumatici", 6° Workshop AIT "Tribologia e Industria". Apr. 18-19, 2018, Torino, Italy.

Written Opinion and Search Report from the Italian Patent Office mailed Oct. 18, 2023 in related application No. IT 102023000004941, and translation thereof.

* cited by examiner

ROLLING BEARING, IN PARTICULAR A WHEEL HUB ASSEMBLY, HAVING AN IMPROVED SERVICE LIFE AND RELATED METHOD

CROSS-REFERENCE

This application claims priority to Italian patent application no. 102023000004941 filed on Mar. 15, 2023, the entire contents of which are fully incorporated herein by reference.

TECHNICAL FIELD

The present disclosure is directed to a roller bearing, preferably constituting a vehicle wheel hub assembly, having a prolonged service life. The disclosure also relates to a method for prolonging the service life of a roller bearing constituting a vehicle wheel hub assembly without altering the weight and dimensions thereof.

BACKGROUND

A roller bearing typically comprises an inner ring and an outer ring that are rotatable relative to each other about a common axis of symmetry, together defining a radial annular space housing one or more rows of rolling bodies (often cylindrical or conical rollers or balls) that contact respective raceways formed on the rings such as to face the annular space, at least partially delimiting said space. This annular space is often provided with a grease or another lubricating fluid. A roller bearing structured in this way may itself constitute a vehicle wheel hub assembly if either the inner ring or the outer ring, normally the inner ring, is integral with a flange designed to receive a vehicle wheel.

New trends in technological advances require enhanced performance from roller bearings. In particular, "new mobility" (electric cars and shared vehicles) requires the availability of longer lasting roller bearings, i.e. roller bearings having a longer service life under acceptable efficiency conditions (hereinafter simply "life") than the roller bearings currently in use on vehicles.

According to current technical knowledge, to increase the life of a roller bearing, the dimensions and therefore the weight of the roller bearing typically have to be increased.

However, current technological requirements do not permit an increase in the dimensions and weight of the roller bearings. In particular, an increase in weight results in greater energy consumption by the vehicle, and consequently an increase in $CO_2$ emissions (in vehicles with internal combustion engines) or a reduction in battery range (in electric vehicles).

It is known from the technical literature that the addition of graphene to a lubricating grease or oil can reduce friction between sliding surfaces.

For example, in Francesca Curà et al., "*Experimental investigation about tribological performance of graphene-nanoplatelets as additive for lubricants*", AIAS International Conference on Stress Analysis, 2018, 2452-3216, Elsevier BV, the addition of graphene nanoparticles (nanoplatelets) to a lubricating grease or oil used to lubricate sliding surfaces is described, such as to lubricate the surfaces of a splined coupling in mechanical components. The different experiments described therein also use a lubricating grease for bearings, in which graphene nanoplatelets that are 2 nm thick and less than 2 nm in diameter (i.e. substantially circular) are dispersed. Tests were carried out on compositions of lubricating grease enriched with different quantities of graphene nanoplatelets, specifically 0.5%, 5% and 10% (it is not specified whether by weight or volume), obtaining in all cases a reduction in the coefficient of friction measured by a tribometer.

In addition, in Pape et al., "*Investigations on graphene platelets as dry lubricant and as grease additive for sliding contacts and roller bearing application*", January 2020, Lubricants, 8, 3; doi 10.3390, experiments were described in which graphene nanoplatelets were applied to sliding surfaces either on their own dispersed in a solvent, or added by simple mixing to a lubricating grease, which is then also used in a roller bearing subjected to pivot oscillating motion less than 360° (i.e. the inner and outer rings of the bearing therefore never complete a full relative rotation).

A barium complex soap-based lubricating grease with added graphene nanoplatelets having a thickness of 2 nm, or 6-8 nm or greater is described (the shape of the nanoplatelets was not specified, although it is noted that substantially rectangular graphene nanoplatelets are available on the market). The quantity of graphene nanoplatelets in the lubricating grease was 1% by weight of the total weight of the lubricating grease. This lubricating grease was tested and also verified a substantial reduction in friction that was measured using torque sensors on bearings subjected to oscillating rotational movement over a limited angular arc.

However, it is known that a reduction in the internal friction of a roller bearing does not automatically prolong the service life thereof. Consequently, the aforementioned publications are not useful in resolving the technical problem of increasing the service life of a roller bearing subjected to repeated rotations, in particular where the roller bearing constitutes a vehicle wheel hub assembly.

SUMMARY

In one non-limiting aspect of the present teachings, techniques are disclosed for prolonging the service life of a roller bearing, which e.g., constitutes a part of a vehicle wheel hub assembly, without increasing the weight and/or dimensions thereof.

For example, in one aspect of the present teachings, a method for increasing the service life of a roller bearing constituting a part of a vehicle wheel hub assembly is disclosed.

In another aspect of the present teachings, a roller bearing, which e.g., constitutes a part of constituting a vehicle wheel hub assembly, is disclosed.

BRIEF DESCRIPTION OF THE DRAWINGS

Additional features and advantages of the present teachings are set out in the following description of a non-limiting, representative embodiment thereof, provided with reference to the figures in the appended drawings, in which.

DETAILED DESCRIPTION

Figure 2:
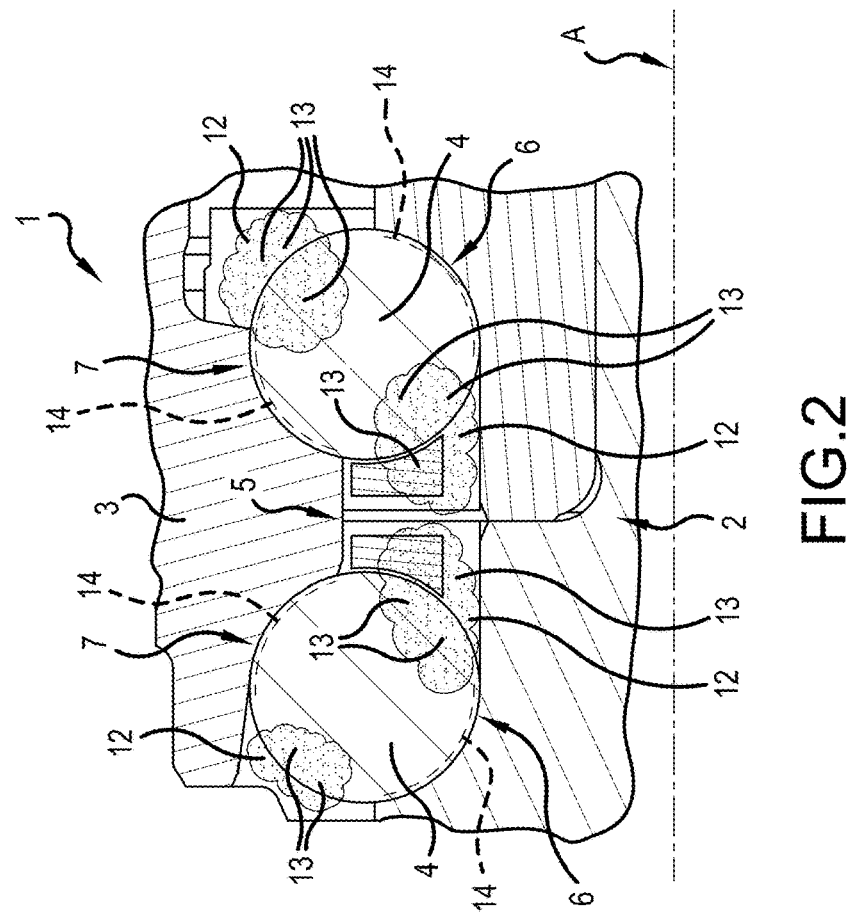
FIG. 2 is a schematic enlarged view of a portion of FIG. 1.
Figure 1:
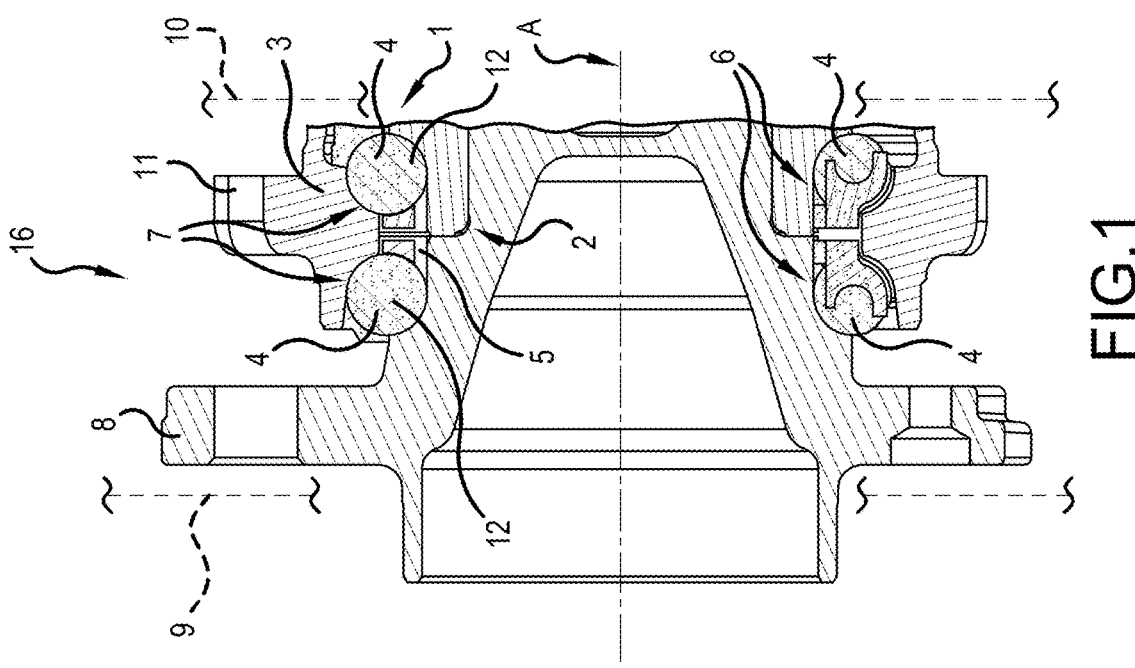
FIG. 1 is a partial longitudinal schematic radial cross section view of a roller bearing constituting a part of a vehicle wheel hub assembly according to one embodiment of the present teachings.

In FIGS. 1 and 2, reference sign 1 denotes as a whole a roller bearing having a known structural configuration. In particular, according to the preferred embodiment described hereinafter, the roller bearing 1 constitutes a part of a vehicle wheel hub assembly 1b (e.g., of any known type).

The roller bearing 1 comprises an inner ring 2, an outer ring 3, and a plurality of rolling bodies (rolling elements) 4 housed in an annular space 5 between the inner ring 2 and the outer ring 3.

The rolling bodies (rolling elements) 4 contact (engage) raceways 6, 7. More specifically, a pair of raceways 6 is defined on the radially outer lateral surface of the inner ring 2, and a pair of raceways 7 is defined on the radially inner lateral surface of the outer ring 3.

The two raceways 6 are disposed (arranged) in tandem around an axis A of symmetry of the rings 2 and 3, which are coaxial to one another. Similarly, the raceways 7 are also disposed (arranged) in tandem around the axis A of symmetry of the rings 2 and 3. Consequently, the raceways 6 are arranged side-by-side and adjacent and opposite (facing, opposing) the corresponding pair of raceways 7 arranged in the same manner.

The rolling bodies 4 are arranged in rows in (on) the raceways 6 and 7 and slide (roll) thereon such that the rings 2 and 3 are relatively rotatable about the axis A. For example, the raceways 7 are stationary in operation, and the raceways 6 rotate relative to the raceways 7 in operation.

In one example of the preferred non-limiting embodiment described herein, the roller bearing 1 is a part of, and substantially itself constitutes, a vehicle wheel hub assembly 1b, since the inner ring 2 is integral with a flange 8 designed, in a known way, to receive (hold) a known vehicle wheel 9 when in use.

On the other hand, the outer ring 3 is designed to be fastened when in use to a known vehicle suspension upright (support) 10, for example via (by means of) a second flange 11 arranged (disposed) to at least substantially face the flange 8, but on the side opposite the flange 8. The wheel 9 and the suspension upright 10 are shown only schematically and only partially with hatching for the sake of simplicity of illustration.

The pairs of raceways 6 and 7 face and at least partially delimit (define) the annular space 5 (in particular, the raceways 6 define a radially inner edge of the annular space 5 and the raceways 7 define a radially outer edge of the annular space 5), such that the rolling bodies 4 can enable (facilitate) the relative rotation of the rings 2 and 3. In this case, the outer ring 3 is stationary when in use and the inner ring 2 is rotatable relative to the outer ring 3 when in use.

The roller bearing 1, or the wheel hub assembly 1b, also comprises a lubricating grease 12 disposed in the annular space 5, at least on the raceways 6, 7, such that the rolling bodies 4 are at least partially immersed in and/or in contact with the lubricating grease 12.

The lubricating grease 12 preferably contains graphene nanoparticles 13, illustrated not to scale (because the nanoparticles have nanometric dimensions) and for purely illustrative purposes in FIG. 2.

The raceways 6 and 7 preferably have a roughness value within a first predetermined range.

This roughness value of the raceways 6, 7 within the first predetermined range is preferably between 0.05 μm and 0.15 μm inclusive, i.e. from 0.05 μm to 0.15 μm including the end points. These values are Ra roughness values, i.e. arithmetic mean roughness values.

More specifically, Ra roughness is defined as the mean of the deviations (taken as absolute values) of the actual profile of a surface (in this embodiment, the sliding surfaces of the raceways 6, 7) from the midline, i.e. the nominal or ideal design position of that surface. The mean value, expressed in microns, of the ordinates y1, y2, y3, . . . yn of the actual radial profile of the raceways 6, 7 in relation to the midline thereof are then examined.

In combination with the specific Ra roughness range of the raceways 6, 7 defined above, the graphene nanoparticles 13 are preferably uniformly dispersed in suspension in the lubricating grease 12 (at least at the beginning of a first operation of the roller bearing 1 after the lubricating grease 12 has been initially disposed therein) in a predetermined percentage by weight. Furthermore, the graphene nanoparticles 13 preferably are at least substantially circular and have a diameter within a preferred range and a thickness within a second predetermined range.

Preferably, the graphene nanoparticles 13 have a diameter of less than 2 μm and a thickness of 2 nm to 8 nm, e.g., any thickness within the range defined by these two limit values. The diameter and thickness have been shown to be critical parameters.

The lubricating grease 12 preferably contains a quantity of the graphene nanoparticles 13 (or graphene nanoplatelets or GNP) by weight in the range from 1% to 2% inclusive.

Indeed, this graphene nanoparticle concentration parameter has also been shown to be a critical parameter, as will be further explained below.

The aforementioned predetermined percentage by weight and the first and second predetermined dimensional ranges have been selected to generate in use, as a result of the relative rotation between the inner ring 2 and the outer ring 3 and the sliding (rolling) of the rolling bodies 4 on the raceways 6 and 7, a self-regenerating mat (layer) 14 of graphene nanoparticles 13 that at least partially coats the raceways 6, 7. This self-regenerating mat 14 is illustrated with hatching in a manner that is out of scale (because it is a layer (mat) having nanometric dimensions) for purely illustrative purposes in FIG. 2.

The layer or mat 14 formed by graphene nanoparticles 13 deposited by the lubricating grease 12 on the sliding surface of the raceways 6 and 7 as a result of the rolling bodies 4 rolling thereon is surprisingly able to considerably prolong the service life of the roller bearing 1/1b, at substantially equal coefficients of friction, which in fact varied surprisingly very little in the presence or absence of the "mat" 14 during the experiments conducted by the applicant.

Just as a floor mat prolongs the life of a floor on which the mat is disposed without modifying the intrinsic structure of the floor itself, while being subjected to the same external stresses that would be present in the absence of the mat, the graphene nanoparticles 13 in suspension in the lubricating grease 12 form, in the short term and including in particular as a result of the typical stresses applied to a wheel hub assembly such as the assembly 1b constituted by the roller bearing 1, the mat 14 on the raceways 6, 7, which considerably prolongs the life thereof.

Indeed, experiments have shown that the service life of a roller bearing according to the present teachings can be at least doubled as compared to an identical roller bearing without the graphene nanoparticles 13.

Without wishing to be bound by theory, it appears that the formation of the protective mat 14 is caused by the Hertzian contacts between the rolling bodies 4, i.e. at the locations where the rolling bodies are disposed, and the raceways 6, 7. Here, the combination of the specific roughness of the raceways 6, 7 of the wheel hubs (i.e. from Ra 0.05 to Ra 0.15) and the selection of the dimensions of the graphene nanoplatelets 13 (diameter of less than 2 μm and thickness within the narrow range 2 nm to 8 nm) is critical to development of the protective mat 14. It is believed that the rotation of the rolling bodies 4 along the raceways 6, 7, the Hertzian contacts of the rolling bodies themselves, and the loads applied to the rolling bodies 4 gradually "grind" the nanoparticles 13 in the lubricating grease 12, thereby "spreading" the same in layers one or a few particles 13 thick and forming the protective mat 14.

As an additional surprising effect, unlike any known coating used to cover the raceways of the balls, such as the raceways 6, 7, in order to reduce the wear caused thereto, the protective mat 14 has also been shown to be self-regenerating in that, if excessive loads and/or wear itself resulting from the rotation of the balls 4 cause(s) this mat 14 to thin excessively, to break, to be perforated, or to disappear (for example as a result of an accidental impact of a wheel 9 against a curb, or curb impact), the graphene in the grease 12 subsequently acts to repair any damage caused to the mat 14 by depositing new graphene nanoplatelets 13 on the raceways 6, 7.

For this purpose, the composition of the lubricating grease 12 used has also been shown to be important, and therefore also the chemical and physical parameters thereof in relation to, i.e. in combination with, the quantity of graphene present in the lubricating grease 12. As mentioned above, the quantity by weight of graphene nanoparticles 13 in suspension should be in the range of 1-2 wt. % inclusive.

Indeed, it has been shown that with weight percentages less than 1%, the quantity of graphene in the interface between the balls 4 and the raceways 6, 7 is not enough to maintain a functional protective layer or mat 14, in particular with the mechanical loads and the speeds typical of automotive applications.

Conversely, weight percentages of graphene nanoparticles 13 greater than 2% in the lubricating grease 12 excessively "thicken" the lubricating grease 12, with an accumulation of graphene nanoplatelets 13 that results in an unwanted increase in friction without providing additional benefits in terms of the service life of the raceways 6, 7 and therefore of the roller bearing 1 as a whole.

Preferably, the lubricating grease 12 is chosen to have a base viscosity according to ISO 3140, measured at 40° C., in the range of 40 to 130 mm²/s and an NLGI consistency number of 2.

The NLGI consistency number is a measure of the relative hardness of a grease used for lubrication, as specified by the standard classification of lubricating greases established by the National Lubricating Grease Institute. Here, it is noted that NLGI consistency number 2 has the same hardness as peanut butter.

Moreover, the lubricating grease 12 is preferably a synthetic-based grease comprised of at least primarily of poly-alphaolefins (PAOs, e.g., Group IV lubricating oil) and at least one thickening additive selected from the group consisting of lithium complexes (lithium soaps, i.e. lithium salts of fatty acids), polyurethane (PU), urea, and mixtures thereof.

Finally, to further emphasize the advantages of the present teachings, it has been found that the raceways 6, 7 should preferably have, in a radial section, a profile having pressure lines with an O-configuration according to a known configuration that is therefore not described in detail.

It is also clear from the foregoing that the present teachings also relate to a method for increasing the service life of a roller bearing 1 constituted by, or being part of, a vehicle wheel hub assembly 1b comprising the following steps:

providing respective raceways 6, 7 for a plurality of rolling bodies 4 interposed between an outer ring 3 and an inner ring 2 of the roller bearing 1 with a roughness value Ra within a predetermined range of Ra 0.05 μm to Ra 0.15 μm inclusive, providing a standard lubricating grease 12 for bearings with predetermined physical and chemical properties, enriching it with a content between 1% and 2% by weight of graphene nanoparticles 13 uniformly dispersed therein, choosing at least substantially circular graphene nanoparticles 13 having a diameter of less than 2 μm and a thickness of 2 nm to 8 nm inclusive, disposing the lubricating grease 12 enriched with graphene nanoparticles 13 within an annular space 5 delimited between the outer ring 3 and the inner ring 2 of the roller bearing 1 and toward which the raceways 6, 7 face, so that the lubricating grease 12 enriched with graphene nanoparticles 13 is in at least partial contact with the rolling bodies 4 and with the raceways 6, 7 for the rolling bodies 4.

To obtain the desired efficiency, such a method also preferably includes dispersing the graphene nanoparticles 13 uniformly and simultaneously exfoliating them as individual graphene nanoplatelets 13 in the lubricating grease 12, e.g., using a multiple roller mill to mix/disperse them.

A mill having three (or more, for example five) rolls or a triple roll mill is a machine that uses the cutting force created by three rolls positioned horizontally that rotate in opposite directions and at different speeds in relation to one another in order to mix, refine, disperse or homogenize viscous materials fed between the rollers.

All of the foregoing is particularly true and efficient in the case of a roller bearing constituting a wheel hub assembly such as the assembly 1b. Indeed, the flange 8 is subjected by the wheel 9 of the vehicle to stresses that it transmits to the raceways 6, 7 and to the rolling bodies 4 (balls-balls, rollers-balls). Such stresses typical of a wheel hub assembly 1b interposed between a suspension upright 10 of a vehicle and a wheel 9 of the vehicle itself, together with the chosen geometry of the wheel hub assembly 1b (raceways 6, 7 having pressure lines with an "O" configuration) enable a protective layer (mat) 14 of graphene nanoparticles (GNP) 13, possibly ground, to be deposited and maintained on the raceways 6, 7 themselves, thereby prolonging the service life of the wheel hub assembly 1b in an unexpected manner, while requiring no substantial modifications to the geometry of the wheel hub assembly 1b itself or to the production cycle, but merely the addition of specific graphene nanoparticles in specific quantities to the bearing grease 12, which is in all cases selected specifically to even further emphasize not only the formation of the protective layer 14, but also the self-regenerating capability thereof.

The graphene used as an additive for the grease 12 of the bearings in the described embodiment (i.e. respecting the critical parameters emphasized) improves the performance of the roller bearings. In particular, the service life of the roller bearings 6, 7, the conductivity thereof, as well as friction and false brinelling (a known defect that may occur in known wheel hub assemblies) may be improved using graphene as an additive in the manner described herein. In particular, the following is obtained:

Service life of the bearing and of the raceways: 2-10 times longer,

Bearing friction: reduction of up to 15% at specific speeds,

False brinelling: reduction of up to 15%,

Increased thermal and electric conductivity (relevant for the application of the kinematic chain in electric vehicles), and Reduced wear of bearing gaskets.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A roller bearing comprising:
an inner ring having a raceway,
an outer ring having a raceway and being configured to rotate relative to the inner ring,
a first row of rolling elements in an annular space between the raceway of the inner ring and the raceway of the outer ring, and
a lubricating grease disposed in the annular space on the inner ring raceway and on the outer ring raceway and on the rolling elements,
wherein:
the inner ring raceway and the outer ring raceway each have a roughness value Ra of from 0.05 to 0.15 microns,
the lubricating grease contains 1-2 wt % of graphene particles uniformly dispersed in a suspension in the lubricating grease,
the graphene particles are graphene nanoparticles and/or graphene nanoplatelets,
the graphene particles have an at least substantially circular shape, and
the graphene particles have a diameter of less than 2 microns and a thickness of 2-8 nm.

2. The roller bearing according to claim 1, wherein:
the lubricating grease comprises a lubricating oil having a base viscosity of 40-130 mm²/s measured at 40° C. according to ISO 3140, and
the lubricating grease has an NLGI consistency number of 2.

3. The roller bearing according to claim 1, wherein the lubricating grease is a synthetic-based grease comprising polyalphaolefins and at least one thickening additive selected from the group consisting of lithium complexes, polyurethane, urea, and mixtures thereof.

4. The roller bearing according to claim 1, wherein:
the inner ring raceway has first and second inner raceways disposed side-by-side, the outer ring raceway has first and second outer raceways disposed side-by-side,
the first row of rolling elements contacts the first inner raceway and the first outer raceway,
a second row of rolling elements contacts the second inner raceway and the second outer raceway, and
the raceways have, in a radial section, a profile with pressure lines according to an O configuration.

5. The roller bearing according to claim 4, wherein:
the lubricating grease comprises a lubricating oil having a base viscosity of 40-130 mm²/s measured at 40° C. according to ISO 3140, and
the lubricating grease has an NLGI consistency number of 2.

6. The roller bearing according to claim 5, wherein the lubricating grease is a synthetic-based grease comprising polyalphaolefins and at least one thickening additive selected from the group consisting of lithium complexes, polyurethane, urea, and mixtures thereof.

7. A wheel hub assembly for a vehicle comprising:
a roller bearing according to claim 1, and
a flange configured to support a wheel of the vehicle, the flange being integral with the inner ring of the roller bearing,
wherein the outer ring is configured to be fixedly mounted on a suspension upright of the vehicle.

8. A method comprising:
rotating one of the inner and outer rings of the roller bearing of claim 1 relative to the other of the inner and outer rings, thereby causing the rolling elements to slide on the raceways and causing a self-regenerating mat of graphene that at least partially coats the raceways to develop.

9. A method for increasing the service life of a roller bearing provided in a wheel hub assembly of a vehicle, comprising:
providing an inner ring having a raceway and an outer ring having a raceway, each of the raceways having a roughness value Ra of from 0.05 to 0.15 microns,
providing a plurality of rolling elements in an annular space between the inner ring raceway and the outer ring raceway,
providing a lubricating grease for bearings containing 1-2 wt % of uniformly dispersed graphene nanoparticles and/or graphene nanoplatelets, the graphene nanoparticles or graphene nanoplatelets having an at least substantially circular shape, a diameter of less than 2 microns and a thickness of 2-8 nm, and
disposing the lubricating grease in the annular space so that the lubricating grease contacts at least parts of the inner ring raceway and the outer ring raceway and the plurality of rolling elements.

10. The method according to claim 9, further comprising using a multiple roller mill to uniformly disperse and exfoliate the graphene nanoparticles as individual nanoplatelets in the lubricating grease.

11. A roller bearing comprising: an inner ring, an outer ring, a plurality of rolling bodies housed in an annular space defined between the inner ring and the outer ring, the rolling bodies contacting respective raceways defined on the inner and outer rings and partly delimiting the annular space, to which they are facing, so that the inner and outer rings are relatively rotatable, and a lubricating grease disposed in the annular space and at least on the raceways, so that the rolling bodies are at least partly immersed in, and/or in contact with, the lubricating grease that is enriched with 1-2 wt % of graphene nanoparticles;

wherein:

the raceways each have roughness value Ra of from 0.05 to 0.15 microns; and the graphene nanoparticles are present uniformly dispersed in suspension in the lubricating grease and have a substantially circular shape with a diameter of less than 2 and a thickness of 2-8 nm.

12. A method comprising:

rotating one of the inner and outer rings of the roller bearing of claim 11 relative to the other of the inner and outer rings, thereby causing the rolling elements to slide on the raceways and causing a self-regenerating mat of graphene that at least partially coats the raceways to develop.

\* \* \* \* \*